United States Patent
Mueller et al.

(10) Patent No.: US 7,402,780 B2
(45) Date of Patent: Jul. 22, 2008

(54) THERMOSTAT FOR A HEAT PUMP OR CONVENTIONAL HEATING SYSTEM

(75) Inventors: Carl J. Mueller, St. Louis, MO (US); John M. Sartain, St. Louis, MO (US); Bartholomew L. Toth, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 478 days.

(21) Appl. No.: 11/193,550

(22) Filed: Jul. 29, 2005

(65) Prior Publication Data

US 2007/0023416 A1    Feb. 1, 2007

(51) Int. Cl.
*H05B 1/02*    (2006.01)
(52) U.S. Cl. .................. 219/494; 219/491; 219/497; 219/508; 236/1 C; 236/91 R; 165/241
(58) Field of Classification Search .................. 219/494, 219/197, 499, 481, 491, 507–509, 505, 497; 236/1 C, 15 C, 49.2, 91 R; 160/241, 331, 160/160; 165/241, 251
See application file for complete search history.

(56) References Cited

U.S. PATENT DOCUMENTS

| | | | |
|---|---|---|---|
| 4,627,483 A * | 12/1986 | Harshbarger et al. ........ 237/2 A |
| 5,628,200 A * | 5/1997 | Pendergrass .................. 62/197 |
| 6,729,390 B1 | 5/2004 | Toth et al. .................... 165/242 |
| 7,261,243 B2 * | 8/2007 | Butler et al. ................. 236/1 C |

* cited by examiner

*Primary Examiner*—Mark H Paschall
(74) *Attorney, Agent, or Firm*—Harness, Dickey & Pierce, P.L.C.

(57) ABSTRACT

A thermostat is provided comprising a first connector for connecting to an air conditioner, a second connector for connecting to either a conventional heater or a heat pump reversing valve, and a selection means for selecting from at least a first mode of operation and a second mode of operation. The first mode of operation is configured to establish cooling by providing an on signal to the first connector and to establish heating by providing an on signal to the second connector. The second mode of operation is configured to establish cooling by providing an on signal to the first and second connectors, and heating by providing an on signal to the first connector but not the second connector. When the second mode is selected and the second connector is connected to conventional heating, the thermostat detects when both the conventional heating and air conditioning are operating simultaneously during cooling.

11 Claims, 5 Drawing Sheets

THERMOSTAT FOR A HEAT PUMP OR CONVENTIONAL HEATING SYSTEM

FIELD OF THE INVENTION

The present invention relates to thermostats for controlling conventional heating systems as well as heat pump systems.

BACKGROUND OF THE INVENTION

Thermostats are typically used to control climate control systems to maintain the temperature of the space conditioned by the climate control system. A conventional thermostat compares the sensed temperature of the space with a set point temperature and activates the climate control system to heat or cool the space to the desired set point temperature. Some heating systems may comprise a fuel-fired heating system, while others comprise a heat pump and an auxiliary heat system. Various types of thermostats are available to control heating by turning on a fossil fuel furnace or alternatively a heat pump system depending on which system is installed. In the case of a heat pump with a back-up heat system, the thermostat controls both systems by turning on the heat pump when there is a demand for heating, and turning on the auxiliary heat system when the heat pump is not providing adequate heating. However, present thermostats cannot identify connection to a heat pump or a conventional heating system, or problems with miss-connection to such systems. In fact, a thermostat inappropriately connected to either system would cause inability of the system to achieve the set point temperature, and would only exacerbate the problem by continuing to request operation of the problematic system.

SUMMARY OF THE INVENTION

Various embodiments of a thermostat for controlling either a conventional heating system or a heat pump system are provided that are able to detect a condition indicative of a miss-configuration of the thermostat. In accordance with one aspect of the present invention, one embodiment of a thermostat is provided for controlling the operation of an air conditioning system and either a conventional heating system or a heat pump system for a space. The thermostat comprises a first connector for connecting to an air conditioning system, a second connector for connecting to either a conventional heat system or a heat pump reversing valve, a selection means for selecting from at least a first mode of operation and a second mode of operation of the thermostat. The first mode of operation is configured to establish cooling by providing an on signal to the first connector and to establish heating by providing an on signal to the second connector. The second mode of operation is configured to establish cooling by providing an on signal to the first connector and an on signal to the second connector, and to establish heating by providing an on signal to the first connector and an off signal to the second connector. When the second connector is connected to a conventional heating system, such that during cooling operation the air conditioning system and the conventional heating system may be simultaneously operated; the thermostat detects a predetermined increase in temperature in the space and responds by discontinuing cooling operation.

In another aspect of the present invention, a second embodiment is provided for controlling the operation of an air conditioning system and either a conventional heating system or a heat pump system with back up electric heating for a space. The second embodiment comprises a first connector for connecting to an air conditioning system, a second connector for connecting to either a conventional heat system or a heat pump reversing valve, a third connector for connecting to a back up electric heating system, and a selection means for selecting from at least a first mode of operation and a second mode of operation of the thermostat. The first mode of operation is configured to establish cooling by providing an on signal to the first connector and to establish heating by providing an on signal to the second connector. The second mode of operation is configured to establish cooling by providing an on signal to the first connector and an off signal to the second connector, and to establish a higher level of heating by providing an on signal to the first connector, an off signal to the second connector, and an on signal to the third connector. When the second connector is connected to a heat pump reversing valve that enables air conditioning operation when not energized, such that during a higher level of heating operation, the heat pump operates in cooling mode simultaneous with back up electric heat system operation, the thermostat detects a predetermined decrease in temperature in the space and responds by discontinuing heating operation.

In another aspect of the present invention, a third embodiment is provided for controlling the operation of an air conditioning system and either a conventional heating system or a heat pump system. The third embodiment comprises a first connector for connecting to an air conditioning system, a second connector for connecting to either a conventional heat system or a heat pump reversing valve, and a selection means for selecting from at least a first mode of operation and a second mode of operation of the thermostat. The first mode of operation is configured to establish air conditioning by providing an on signal to the first connector and to establish heating by providing an on signal to the second connector. The second mode of operation is configured to establish air conditioning by providing an on signal to the first connector and either an on or off cool signal to the second connector depending on thermostat set-up, and to establish heating by providing an on signal to the first connector and a signal to the second connector that is opposite the cool signal. When the thermostat is set up to provide on signals to both the first and second connectors to establish cooling operation, but the second connector is connected to a heat pump reversing valve that enables heating operation when energized such that the heat pump provides heating when cooling is called for, the thermostat detects a predetermined increase in temperature in the space and responds by discontinuing cooling operation.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

Corresponding reference numerals indicate the corresponding parts throughout the several views of the drawings.

DETAILED DESCRIPTION OF THE EMBODIMENTS

The following description of the various embodiments are merely exemplary in nature and are in no way intended to limit the invention, its application, or uses.

Figure 1:
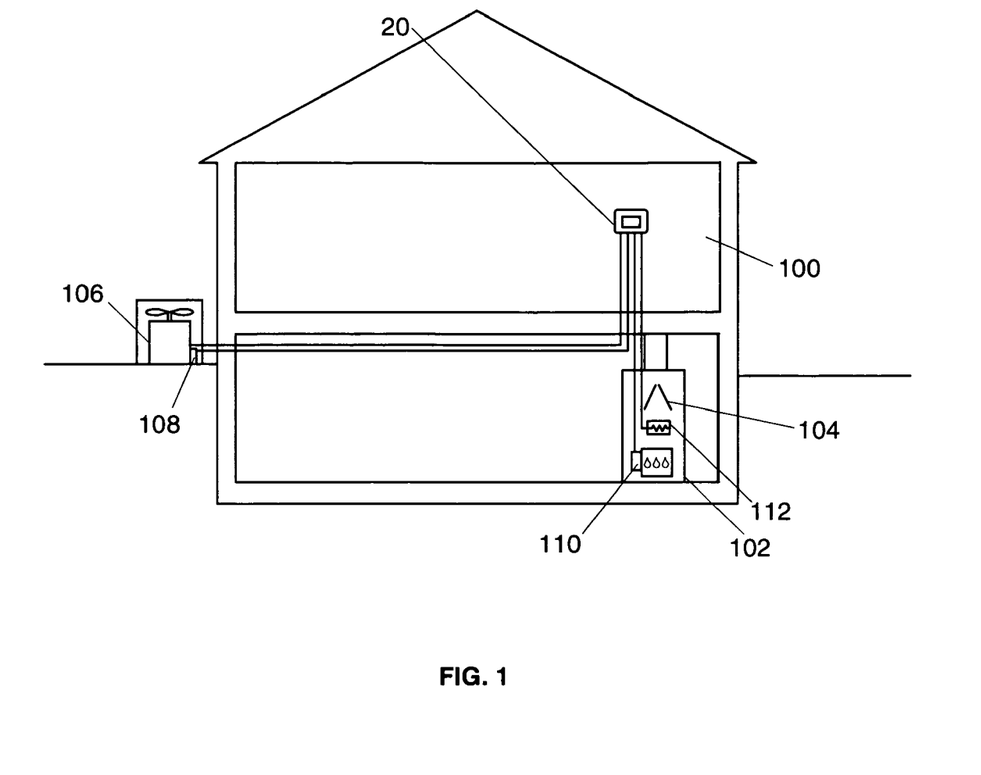
FIG. 1 is an illustration of a space having a thermostat in accordance with the present invention for use with an air conditioning system and a conventional heating system or heat pump system.

A space that may be conditioned by climate control systems in which various embodiments of a thermostat can be illustrated in FIG. 1. The climate control system for the space 100 includes an indoor air handler 102 having a condenser coil 104 associated with either an air conditioning system or a heat pump system. In the various embodiments, a thermostat 20 is adapted to be connected to and control an air conditioning system 106 and either a heat pump reversing valve 108 (thereby rendering the air conditioning system a heat pump system) or a conventional heating system 110. Some thermostat embodiments may also be connected to a back-up electric heating system 112. The various embodiments of a thermostat may be set up to control a combination of different climate control systems.

Figure 2:
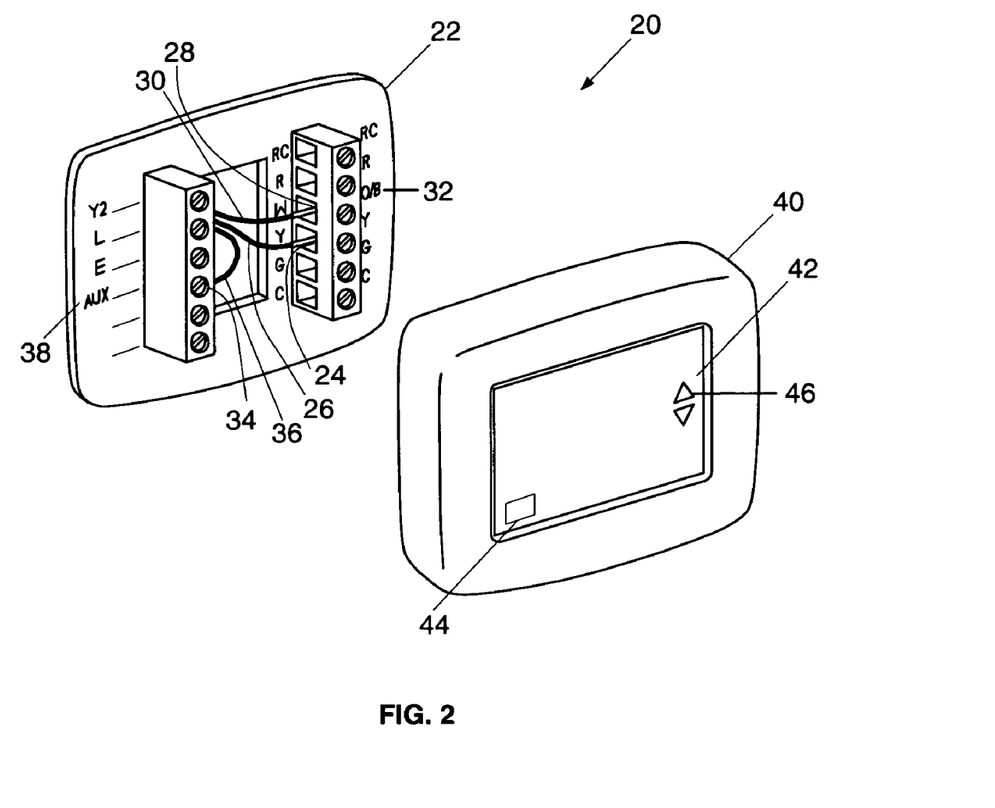
FIG. 2 is a front perspective view, shown disassembled, of one embodiment of a thermostat in accordance with the present invention.

One embodiment of a thermostat 20 according to the principles of the present invention is shown in FIG. 2. The thermostat comprises a sub-base portion 22 and a thermostat display portion 40 adapted to connect to the sub-base portion 22. The thermostat display portion 40 preferably comprises a display 42, an input means 44 for enabling installer set-up, and a selection means 46.

The sub-base portion 22 includes a first connector 24 for enabling connection to a compressor of an air conditioning system 106 via wire 26, where the first connector 24 on the thermostat sub-base 22 is generally labeled "Y". This first connector and other referenced connectors are generally a screw type wire clamp connector, but may alternatively comprise a wire socket or any other connector suitable receiving a wire. The first connector 24 allows the thermostat 20 to provide an "on" signal via wire 26 to an air conditioner 106 to establish cooling operation. An "on" signal typically comprises a 24 vac signal, where the thermostat typically receives power from a 24 volt transformer connected to "RC". The "on" signal may alternatively comprise a half-wave, analog, digital or other signal suitable for activating the typical air conditioning or heating system. The sub-base portion includes a second connector 28 for enabling connection via wire 30 to either a heat pump reversing valve 108 (in which case the air conditioner is also a heat pump system), or a conventional heating system 110. The second connector 26 in the various thermostat embodiments is designated as both "W" and also "O/B", as shown at 32. The "W" designation is associated with the connection of a wire 30 to a conventional heating system 110, which may be a fossil fuel type furnace, an electric furnace, or the like. The second connector 28 allows the thermostat 20 to provide an "on" signal via wire 30 to a conventional heating system, to establish heating operation.

The second connector 28 also has an "O/B" designation associated with a connection via wire 30 to a heat pump reversing valve 108. This second connector 28 allows the thermostat 20 to provide an "on" signal to a heat pump reversing valve 108. An "on" signal to a heat pump reversing valve will enable cooling operation or heating operation of the heat pump, depending on the heat pump type. For example, a Trane heat pump unit will operate in cooling mode when an "on" signal is provided to the heat pump reversing valve 108. Alternatively, a Rheem heat pump unit will operate in heating mode when an "on" signal is provided to the heat pump reversing valve 108. The various thermostat embodiments are therefore configurable for each heat pump type to establish air conditioning operation by providing an "on" signal via the first connector 24 and an "on" signal via the second connector 28, or by providing an "on" signal via the first connector 24 and an "off" signal via the second connector 28. For heat pump system applications, the thermostat 20 preferably is set to a default setting for providing an "on" cool signal to the "O/B" connector for establishing cooling operation. In addition to the second connector 28, some thermostat embodiments further comprise a third connector 34 for complimenting certain heat pump system applications. In some heat pump systems, a back up electric heat system 112 is also included, for situations when the heat pump does not provide adequate heat (when outside temperatures below freezing limit the heat pump capacity). When such situations occur, these thermostat embodiments provide an "on" signal to the back up electric heating system in addition to operating the heat pump to establish a higher level of heating.

The second connector 28 therefore serves the purpose of providing for a single connection to either a conventional heat system 110 (W), or a heat pump reversing valve 108 (O/B) for heat pump applications. The various thermostat embodiments accordingly comprise at least a first mode of operation and a second mode of operation of the thermostat, wherein the first mode provides for control of a conventional heating system and the second mode provides for control of a heat pump system. The first mode of operation is configured to establish air conditioning operation by providing an "on" signal to the first connector 24, and to establish heating operation by providing an "on" signal to the second connector 28. The second mode of operation for heat pump applications is configured to establish air conditioning by providing an "on" signal to the first connector 24 and either an "on" or "off" cool signal to the second connector 28, depending on thermostat set-up. The second mode of operation also establishes heating operation by providing an "on" signal to the first connector 24 and a signal to the second connector 28 that is opposite the cool signal set up in the thermostat. For heat pump system applications, the various embodiments of a thermostat 20 preferably are set to a default setting for providing an "on" cool signal to the "O/B" connector for establishing cooling operation. Some embodiments of a thermostat further provide a default setting for operating in a first mode for controlling an air conditioning system and a conventional heating system. The various thermostat embodiments accordingly provide for modifying the thermostat's default set up to accommodate different types of climate control or heat pump systems.

The various thermostat embodiments may further comprise an input means 44 for enabling the installer to set-up the thermostat. Specifically, the input means 44 may comprise a single physical button or touch screen point, or alternatively may comprise two or more buttons or touch screen points that are depressed by the installer. The installer may then use a selection means for selecting from at least a first mode of operation and a second mode of operation. In some thermostat embodiments, the installer may select a "1" for a typical air conditioning system 106 and conventional heating system 110, or a "2" for a single stage heat pump system 108, with "1" being the default setting. Alternatively, the installer may leave the thermostat in its default "1" mode of operation for a typical air conditioning system and conventional heating system. The installer may adjust the thermostat mode of operation. to the number "2" for a Trane heat pump, in which case providing an "on" signal to the first connector 24 and an "on" signal to the second terminal 28 would provide for cooling operation. If the installer inadvertently selected the number "2" setting for an air conditioning system and conventional heating system, providing the "on" signal as above to both the first connector 24 in connection with the air conditioning system 106 and the second connector 28 in connection with the conventional heating system 110 would simultaneously operate both the air conditioner and the heating system. This could cause serious damage to the condenser coil 104 of the air conditioning system 106. Thus, depending on whether the second connector 28 is connected to a conventional heating system or a heat pump reversing valve, it is important that the thermostat be set-up in the appropriate mode of operation to be compatible with the system type.

Some thermostat embodiments further provide for selection of other system types, such as a heat pump system 108 with auxiliary heat in the form of a back up electric heating system 112. The thermostat embodiment shown in FIG. 2 comprises a third connector 38 for such a system type. The third connector 34 allows the thermostat to accommodate situations when the heat pump fails to adequately increase the space temperature (when low outside temperatures limit the heat pump capacity), by providing an "on" signal to the third terminal 34 connected via wire 36 to a back up electric heating system 112. For example, in a Rheem heat pump with back up electrical heating, the thermostat shown in FIG. 2 would provide an "on" signal to the first connector 24, an "on" signal to the second connector 28, and an "on" signal to the third connector 34 to enable a higher level of heating operation than only heat pump operation. The connector 34 is designated as "AUX" for a heat pump with auxiliary heating system type, which would be selected by the installer during set-up of the thermostat. The installer may also set-up heat pump types by entering a selection for the "O/B" setting, as to whether the heat pump reversing valve is switched "on" for cooling or "on" for heating operation. It should be noted that the various thermostat embodiments may comprise a plurality of modes of operation for other heat pump or multi-stage system types.

Figure 3:
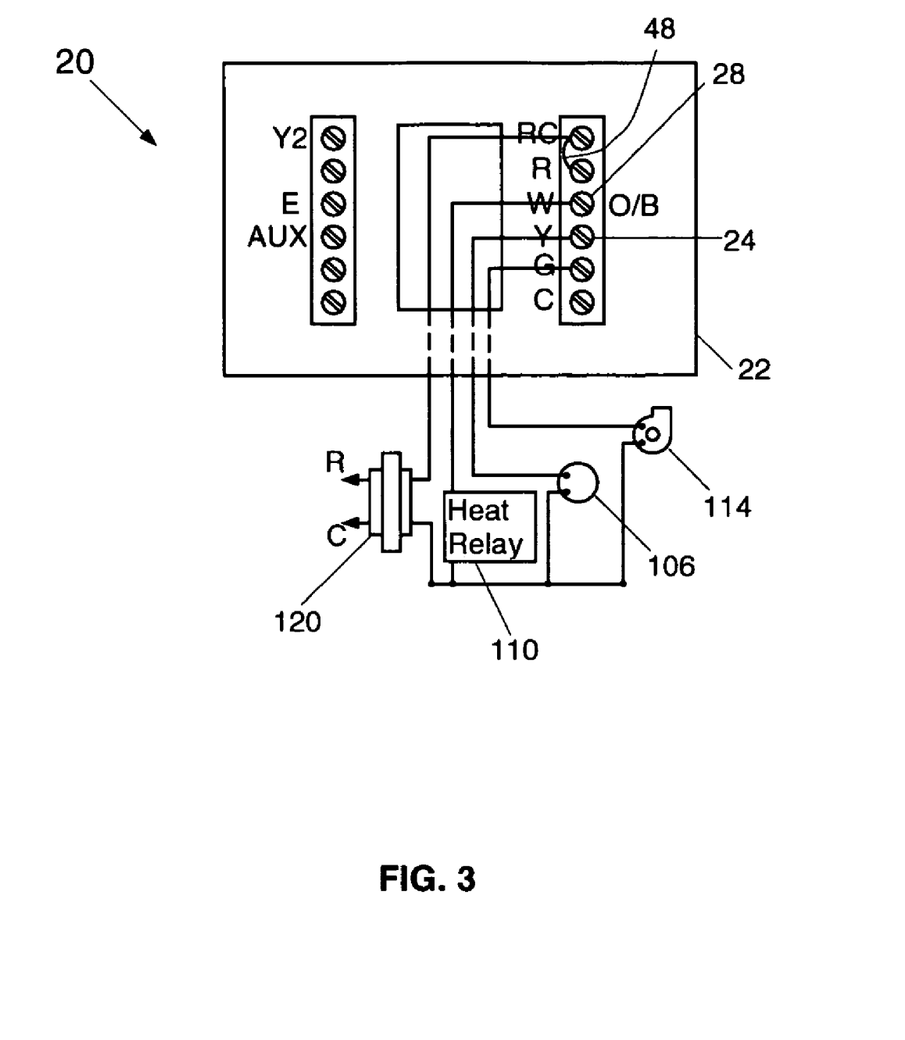
FIG. 3 is a schematic diagram of a first embodiment of a thermostat.

In a first embodiment shown in FIG. 3, a thermostat 20 is provided for controlling the operation of an air conditioning system 106 and either a conventional heating system 110 or a heat pump system 108 for a space. The first embodiment comprises a first connector 24 for connecting to an air conditioning system 106, a second connector 28 for connecting to either a conventional heat system 110 or a heat pump reversing valve 106, and a selection means 46 for selecting from at least a first mode of operation and a second mode of operation of the thermostat 20. The first mode of operation is configured to establish cooling by providing an on signal to the first connector 24 and to establish heating by providing an on signal to the second connector 28. The second mode of operation is configured by default to establish cooling by providing an on signal to both the first connector 24 and the second connector 28, and to establish heating by providing an on signal to the first connector 24 and an off signal to the second connector 28. When the second connector 28 is connected to a conventional heating system 110 as shown in the schematic in FIG. 3, the inappropriate selection of the second mode would permit the air conditioning system 106 that is connected to the first connector 24 and the conventional heating system 110 that is connected to the second connector 28 to be simultaneously operated when the thermostat calls for cooling. This situation could occur where an installer seeking to select the number "1" system presses the selection means 44 one time with the belief that he has selected the first system type of an air conditioning and conventional heating system. However, such a selection would inadvertently change the default setting of "1" to the setting number "2" corresponding to a heat pump system. After making the inappropriate selection, the installer could subsequently test the thermostat by selecting heating operation. In the "2" heat pump setting, the thermostat would establish heating by sending an "on" signal to the first connector 24, which would actually initiate the air conditioning compressor 106 and the circulating fan 114. However, the installer could mistake the circulating fan operation for that of the conventional heating system 110, since the air being circulated immediately after activation would not be affected by either cooling or heating operation. The installer could also request cooling operation to test the thermostat, which in the "2" heat pump mode would establish cooling by sending an "on" signal to both the first connector 24 and second connector 28. This would turn on both the air conditioner 106 and conventional heat system 110, which the installer might not be able to detect in a short time of operation. The simultaneous operation of the air conditioner and conventional heating system could cause serious damage to the condenser coil 104 of the air conditioning system 106. Accordingly, during cooling operation in the second mode of operation, the thermostat 20 is adapted to detect a predetermined increase in temperature in the space indicative of operation of the conventional heating system 110, and to respond by discontinuing cooling operation. In the first thermostat embodiment, the predetermined temperature increase is selectable within the range of about 3 degrees to 10 degrees Fahrenheit, and has a default value of 3 degrees. The first thermostat embodiment 20 further comprising a display 42, wherein the thermostat provides a notice of an inappropriate set-up of the thermostat on the display 42. Thus, the first embodiment of a thermostat is adapted to protect the air conditioning system 106 from damage that may result from inadvertent miss-configuration of the thermostat 20, and to provide notice to an occupant of the improper set-up.

Figure 4:
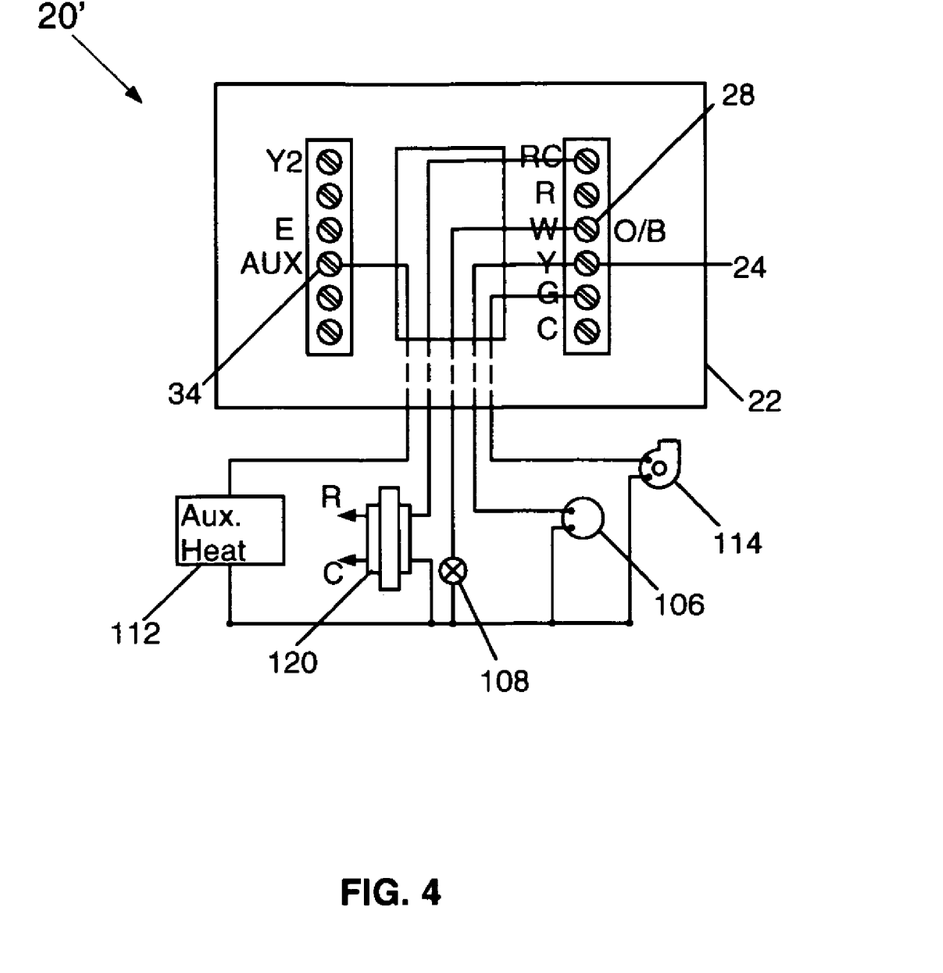
FIG. 4 is a schematic diagram of a second embodiment of a thermostat.

In a second embodiment, a thermostat 20' is provided for controlling the operation of an air conditioning system and either a conventional heating system or a heat pump system with back up electric heating for a space. The second embodiment comprises a first connector 24 for connecting to an air conditioning system 106, a second connector 28 for connecting to either a conventional heat system 110 or a heat pump reversing valve 108, a third connector 34 for connecting to a back up electric heating system 112, and a selection means 46 for selecting from at least a first mode of operation and a second mode of operation of the thermostat 20'. The first mode of operation is configured to establish cooling by providing an on signal to the first connector 24 and to establish heating by providing an on signal to the second connector 28. The second mode of operation has a default configuration of the "O/B" connector for establishing cooling by providing an on signal to the first connector 24 and an on signal to the second connector 28. The second mode of operation has a default configuration of the "O/B" connector for establishing heating operation by providing an on signal to the first connector 24 and an off signal to the second connector 28. The second mode of operation may also establish a higher level of heating by providing an on signal to the first connector 24, an off signal to the second connector 28, and an on signal to the third connector 34. When the third connector 34 is connected to a back up heating system 112 as shown in FIG. 4, and the second connector 28 is connected to a Rheem heat pump that has a reversing valve 108 for enabling air conditioning operation when not energized, the selection of the second mode would permit heating operation in which the heat pump system would operate in cooling mode at the same the back up electric heat system operates. This situation could occur where an installer sets up the thermostat 20' for a heat pump system, but does not change the default set up providing an "on" cool signal to the "O/B" terminal for cooling operation to an "on" heat signal corresponding to the Rheem heat pump unit. Upon initiating heating operation, the Rheem heat pump would operate in cooling mode and the temperature would decrease. The thermostat 20' would eventually switch an "on" signal to the third terminal to activate the back up heating system and provide a higher level of heating. Operating the back up heating system and the heat pump in cooling mode could cause serious damage to the condenser coil 104 of the heat pump system. Accordingly, during cooling operation in the second mode of operation, the thermostat 20' is adapted to detect an inability to affect an increase of a predetermined temperature in a given time, and to respond by discontinuing heating operation. In the second thermostat embodiment, the predetermined temperature increase is at least 2 degrees Fahrenheit, and is selectable from a default value of 2 degrees up to about 10 degrees Fahrenheit. The second thermostat embodiment 20' further comprises a display 42, wherein the thermostat provides a notice of an inappropriate set-up of the thermostat on the display 42. Thus, the second embodiment of a thermostat is adapted to protect the air conditioning system 106 from damage that may result from inadvertent miss-configuration of the thermostat 20', and to provide notice to an occupant of the improper set-up.

In a third embodiment, a thermostat 20" is provided for controlling the operation of an air conditioning system and either a conventional heating system or a heat pump system for a space. The third embodiment comprises a first connector for connecting to an air conditioning system, a second connector for connecting to either a conventional heat system or a heat pump reversing valve, and a selection means for selecting from at least a first mode of operation and a second mode of operation of the thermostat. The first mode of operation is configured to establish air conditioning by providing an on signal to the first connector and to establish heating by providing an on signal to the second connector. The second mode of operation is configured to establish air conditioning by providing an on signal to the first connector and either an on or off cool signal to the second connector depending on thermostat set-up. The second mode is configured to establish heating by providing an on signal to the first connector and a signal to the second connector that is opposite the cool signal. The second mode of operation has a default configuration of the "O/B" connector for establishing cooling by providing an on signal to the first connector 24 and an on signal to the second connector 28. The second mode of operation has a default configuration of the "O/B" connector for establishing heating operation by providing an on signal to the first connector 24 and an off signal to the second connector 28. When the second connector 28 is connected to a Rheem heat pump reversing valve 108 for enabling air conditioning operation when not energized, selection of the second mode would permit the heat pump system to operate in heating mode when cooling operation is called for by the thermostat 20". This situation could occur where an installer sets up the thermostat 20' for a heat pump system, but does not change the default set up providing an "on" cool signal to the "O/B" terminal for cooling operation to an "on" heat signal corresponding to the Rheem heat pump unit. Upon initiating heating operation, the Rheem heat pump would operate in cooling mode and the temperature would decrease. If during cooling operation in the second mode the thermostat 20" detects a predetermined increase in space temperature, the thermostat 20" would responsively discontinue cooling operation. Likewise, if during heating operation in the second mode the thermostat 20" detects a predetermined decrease in space temperature, the thermostat 20" would responsively discontinue heating operation. The third thermostat embodiment 20" further comprises a display 42, wherein the thermostat provides a notice of an inappropriate set-up of the thermostat on the display 42. Thus, the third embodiment of a thermostat is adapted to reduce the unnecessary expenditure of energy resources by shutting off the system and provide notice to an occupant of the improper thermostat set-up.

In yet another embodiment, a thermostat may be provided that further comprises a jumper wire 48 that is installed from the "RC" terminal to the "R" terminal, where the thermostat is adapted to establish 24 volt connection to a conventional heating system from the "R" through the "W" connector 28 when the jumper 48 is in place. Upon set up of the thermostat in the second mode of operation for a heat pump system, the jumper may preferably be removed or cut to restrict the thermostat operation to only that of a heat pump system. In this manner, if the second mode of operation (heat pump system) is inadvertently selected for a conventional heating system (first mode of operation), the thermostat will not be able to provide the proper connection to the conventional heating system should the thermostat provide an on signal to the "O/B" terminal 28 for air conditioning operation.

Figure 5:
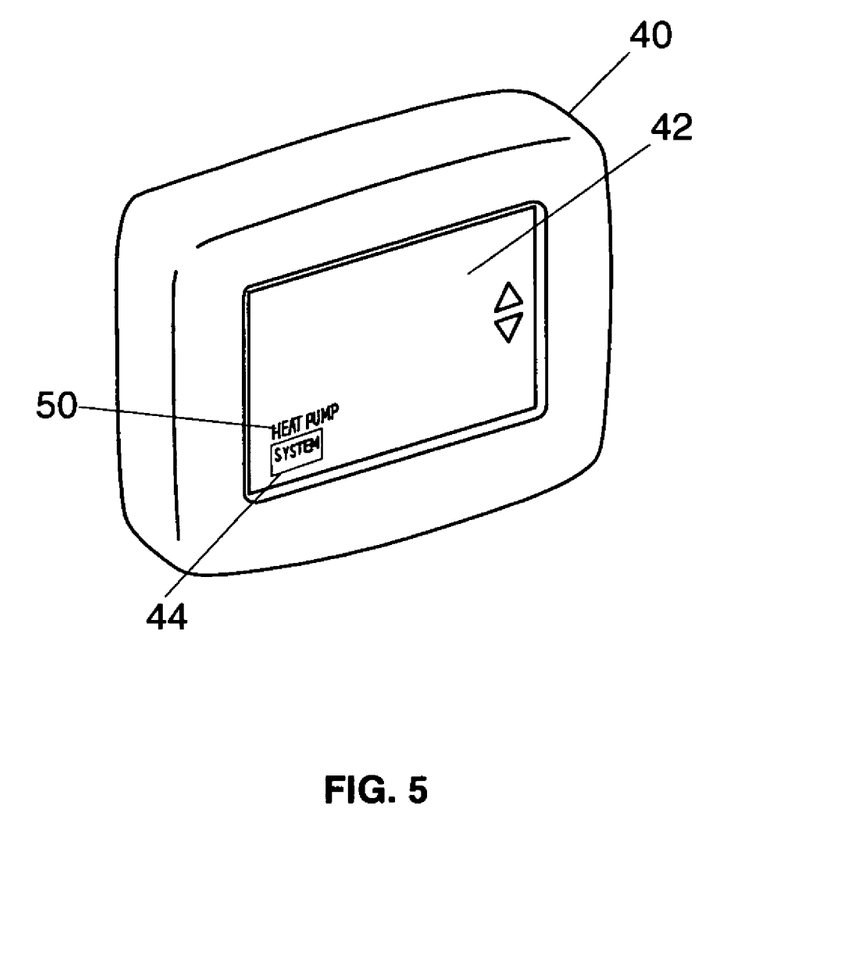
FIG. 5 is a front perspective view of a third embodiment of a thermostat in connection with a climate control system in accordance with the present invention.

Some thermostat embodiments may further provide for displaying an indication of the selected configuration mode of operation on the thermostat's display 42. If in the system menu the installer has selected the control to be configured for a heat pump application, the text "HEAT PUMP" (50) is displayed on the display 42 above the "system" icon 44 as shown in FIG. 5. If in the system menu the installer has selected a fossil fuel system, then no word is displayed. In such embodiments, the display of the system configuration mode after selection gives the installer or user the opportunity to recognize that an incorrect system selection has inadvertently been made. This will help prevent the occurrence of simultaneous operation of both the air conditioner and the heating system that could cause serious damage to the air conditioner condenser. Thus, some embodiments of a thermostat are provided that function to protect the air conditioning system 106 from damage that may result from inadvertent miss-configuration of the thermostat set-up, and also to display the system mode the installer or user has selected to help the installer avoid the possibility of a miss-configuration of the thermostat.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A thermostat for controlling the operation of an air conditioning system and either a conventional heating system or a heat pump system with back up electric heating for a space, the thermostat comprising:

a first connector for connecting to an air conditioning system;

a second connector for connecting to either a conventional heat system or a heat pump reversing valve;

a selection means for selecting from at least a first conventional heating mode of operation and a second heat-pump mode of operation of the thermostat; the first mode of operation being configured to establish air conditioning by providing an on signal to only the first connector and to establish heating by providing an on signal to only the second connector; the second mode of operation being configured to establish air conditioning by providing an on signal to only the first connector and an off signal to the second connector, and to establish heating by providing both an on signal to the first connector and an on signal to the second connector;

where the thermostat is configured to detect when the second connector is connected to a conventional heating system and the second heat-pump mode of operation has inappropriately been selected, in which mode heating operation is established by an on signal to both the first and second connectors which causes the air conditioning system that is connected to the first connector and the conventional heating system that is connected to the second connector to be simultaneously operated, said thermostat being configured to detect the inappropriate selection by monitoring heating operation in the second mode by detecting a predetermined decrease in space temperature, and to responsively discontinue heating operation.

2. The thermostat of claim 1 further comprising a third connector that is connected to a back up electric heat system, wherein the thermostat is set up to establish a higher level of heating operation in the second mode by providing an on signal to the first connector, an off signal to the second connector, and an on signal to the third connector.

3. The thermostat of claim 2 wherein the second connector is connected to a heat pump reversing valve that enables air conditioning operation when not energized, such that when the second mode of operation is selected and the higher level of heating operation is established, the air conditioning system connected to the first connector and the back up electric heat system may be simultaneously operated.

4. The thermostat of claim 1 further comprising a display, wherein the thermostat provides a notice of an inappropriate set-up of the thermostat on the display.

5. The thermostat of claim 4 wherein the predetermined temperature increase is selectable, and is in the range of about 3 degrees to 10 degrees Fahrenheit.

6. A thermostat for controlling the operation of an air conditioning system and either a conventional heating system or a heat pump system for a space, the thermostat comprising:
- a first connector for connecting to an air conditioning system;
- a second connector for connecting to either a conventional heat system or a heat pump reversing valve;
- a selection means for selecting from at least a first conventional heating mode of operation and a second heat-pump mode of operation of the thermostat; the first mode of operation being configured to establish cooling by providing an on signal to only the first connector and to establish heating by providing an on signal to only the second connector; the second mode of operation being configured to establish cooling by providing both an on signal to the first connector and an on signal to the second connector, and to establish heating by providing an on signal to only the first connector and an off signal to the second connector;

where the thermostat is configured to detect when the second connector is connected to a conventional heating system and the second heat-pump mode of operation has inappropriately been selected, in which mode cooling operation is established by an on signal to both the first and second connectors which causes the air conditioning system that is connected to the first connector and the conventional heating system that is connected to the second connector to be simultaneously operated, where the inappropriate selection is detected when during cooling operation the thermostat detects a predetermined increase in temperature in the space, and responsively discontinues cooling operation.

7. The thermostat of claim 6 wherein the predetermined temperature increase is selectable, and is in the range of about 3 degrees to 10 degrees Fahrenheit.

8. The thermostat of claim 7 further comprising a display, wherein the thermostat provides a notice of an inappropriate set-up of the thermostat on the display.

9. A thermostat for controlling the operation of an air conditioning system and either a conventional heating system or a heat pump system with back up electric heating for a space, the thermostat comprising:
- a first connector for connecting to an air conditioning system;
- a second connector for connecting to either a conventional heat system or a heat pump reversing valve;
- a third connector for connecting to a back up electric heating system;
- a selection means for selecting from at least a first mode of operation and a second mode of operation of the thermostat; the first mode of operation being configured to establish cooling by providing an on signal to the first connector and to establish heating by providing an on signal to the second connector; the second mode of operation being configured to establish cooling by providing an on signal to the first connector and an off signal to the second connector, and to establish a higher level of heating by providing an on signal to the first connector, an off signal to the second connector, and an on signal to the third connector;
- wherein the second connector is connected to a heat pump reversing valve that enables air conditioning operation when not energized, such that when the second mode of operation is selected and the higher level of heating operation is established, the heat pump operates in cooling mode simultaneous to operation of the back up electric heating;
- where if during the higher level of heating operation in the second mode the thermostat does not detect a predetermined increase in temperature in a given time, the thermostat responsively discontinues heating operation.

10. The thermostat of claim 9 wherein the predetermined temperature increase is at least about 2 degrees.

11. The thermostat of claim 10 further comprising a display, wherein the thermostat provides a notice of a thermostat malfunction on the display.

* * * * *